Patented Oct. 3, 1950

2,524,111

UNITED STATES PATENT OFFICE 2,524,111

RESINOUS COMPOSITION AND METHOD OF MAKING SAME

Fred G. La Piana, Providence, George N. Houth, Cranston, and Raymond W. Farrell, Saylesville, R. I., assignors to Stein, Hall & Company, Inc., New York, N. Y., a corporation of New York No Drawing. Application September 28, 1945, Serial No. 619,254

6 Claims. (Cl. 260—29.4)

This invention relates to synthetic resinous compositions and more particularly to lactic acid type of resinous compositions made with or containing urea, aldehyde and hydroxy compounds. These compositions have particularly advantageous film forming characteristics and can be used for many purposes, including the treatment of fibrous materials such as textiles, paper, beater pulp, and the like.

It is appreciated that urea resins have been proposed heretofore and that such resins are being used, e. g., for the impregnation of textiles in order to impart anti-crease or various other properties thereto. There are several drawbacks to the known compositions generally used for this purpose. One such drawback is that the heretofore proposed resinous compositions require a relatively high temperature and a relatively long time for curing. This curing tends to weaken or embrittle textile fibers. Another disadvantage thereof is the requirement of an acid catalyst in the resin in order to obtain the desired cure. The acid tends to cause a tendering of the treated textile fiber. Still another drawback is that the treated goods tend to have or develop an odor upon storage unless the goods are given a thorough washing to remove both the over-cured and undercured resin.

As far as is known, lactic acid type resins have not attained any commercial success. This may be due to the poor hardening characteristics of the resins of this type which have been prepared heretofore, and the impermanency of their properties.

It has now been found that the foregoing disadvantages can be overcome by means of new resinous compositions which do not require high curing temperature and long curing time, or the addition of an acid catalyst.

The objects achieved by the invention include: The provision of a resinous composition adapted for the treatment of textiles which does not require an added curing catalyst; the provision of a resinous composition which does not require relatively high curing temperatures and long curing time; and other objects which will be apparent as the invention is more fully developed hereinafter.

Surprisingly enough, it has now been found that resinous compositions comprising a reaction product of an alpha-hydroxy mono-carboxylic acid of at least two carbon atoms, such as lactic acid, a urea component, an aldehyde component, and a substituted ethanol having the general formula

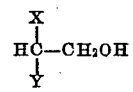

wherein X is a member of the group consisting of H and OH and Y is a member of the group consisting of OH, lower alkoxy, lower hydroxy alkyl and lower hydroxy alkyl ether radicals, Y being a member of the group consisting of OH and lower hydroxy alkyl ether radicals when X is H, and being a member of the group consisting of lower alkoxy and lower hydroxy alkyl radicals when X is OH, such as a glycol, are admirably adapted for film forming purposes, such as for instance, for the treatment of textiles. They impart to textiles a characteristic "hand" or finish. They do not tend to cause embrittlement or tendering of the treated textile fibers. They are free from odor or odor development on storing. They do not require a "hot box" curing treatment and give films which are much more flexible than those from heretofore proposed compositions. They can be used for shrinkage control, water-proofing, glazing, printing and dyeing. They are similarly well adapted for coating paper, leather and the like fibrous materials and impart desirable characteristics thereto.

In a preferred embodiment of the invention, the aldehyde component and the acid component, such as lactic acid, are first reacted then the urea component is added and reacted therein and finally, the substituted ethanol, such as glycol, is added and reacted. The ensuing resin is clear, light colored and slightly viscous and is soluble in water in substantially all proportions.

In another embodiment of the invention, the acid component and the substituted ethanol component are mixed and heated; then the urea component and aldehyde component are mixed therewith and reacted.

The initial reaction should not be carried beyond the point where the product is still water-soluble. The length of time is related to the temperature of the reaction and this can be readily determined by one skilled in the art in view of the examples included hereinafter.

The exact nature of the reaction is not fully understood. We are entirely satisfied, however, that our new resin is of a complex nature and results from a reaction in which the lactic acid and the glycol components take part with the other components. This is to be distinguished from a urea-aldehyde resin plasticized by added glycol lactate. No single initial component can be isolated therefrom by leaching or distillation at lower than thermal decomposition temperatures. However, a condensation by-product, such as water, may be removed.

In order to illustrate the invention, but in no sense as a limitation as otherwise disclosed herein, the following specific examples are included.

*Example 1*

46.7 grams of 40% aqueous formaldehyde and 15.3 grams of 50% lactic acid were mixed and heated to 160° F. with agitation and refluxed for one hour. The reaction mass was then cooled to 140° F. and 14.0 grams of urea was added; heating with agitation was continued until the reaction mass attained a temperature of 205° F.; it was maintained at this temperature for 1 hour 50 minutes, with agitation. The reaction mass was then cooled to 110° F., 20 grams of ethylene glycol was added, with agitation, then the reaction mass was cooled to 70° F. The reaction product had a pH of 4. It was clear, straw colored, and slightly viscous. It was soluble in water in all proportions.

Films of this resin were cast on a glass plate and heated at 114° C. for 10 minutes. The cured film was glass clear, flexible, and completely insoluble in water. Thin films, such as produced on a textile fiber by impregnating with a dilute resin solution and drying, cure in about 1 minute at about 110° C.

*Example 2*

120 grams of ethylene glycol and 360 grams of 85% aqueous lactic acid were mixed and heated in a distilling flask until 125.2 grams of water had been distilled off. The temperature went up to 120° C. It was a viscous, amber colored liquid, soluble in water in all proportions. 154.5 grams (about ⅜ mol) of this product, 120.0 grams (about 2 mols) of urea, and 375.0 grams (about 5 mols) of 38% aqueous formaldehyde were mixed and heated, with agitation and refluxing, for 10 minutes. The reaction mass was then cooled. It was a clear, slightly viscous straw colored liquid, having a pH of 5. It was soluble in water in all proportions.

A film of this resin was cast on a glass plate and heated to 114° C. for 10 minutes. The resulting film was glass clear, flexible and completely insoluble in water. A thin film, such as produced on a textile fiber by impregnating with a dilute resin solution and drying, cure in about 1 minute at about 110° C.

In the broader aspects of the invention, the lactic acid can be replaced by an alpha-hydroxy hydrocarbon-monocarboxylic acid having at least two carbon atoms, such as alpha-hydroxy butyric acid, ortho hydroxy-benzoic acid, and glycollic acid. These acids may conveniently be represented by the general formula RCOOH, wherein R is a member of the group consisting of lower alkyl and phenyl radicals substituted in the alpha-position by a hydroxy group. As the aldehyde component, formaldehyde is preferred. Formaldehyde can be replaced by substances which can supply formaldehyde under the reaction conditions such as, for instance, paraformaldehyde, hexamethylenetetramine, and the term "a formaldehyde component" is used herein as generic to all such compounds. The urea can be replaced in whole or in part by thiourea, guanidine, carbamyl urea or biuret; the term "a urea component" is used herein as generic to all such compounds which are typical of well-known ingredients for this type of resin. The ethylene glycol can be replaced by diethylene glycol, triethylene glycol, glycerine, a glycol mono-ether such as ethylene glycol mono-ethyl ether, a polyglycol such as poly ethylene glycol and 2-amino-2,2-dialkyl-ethanol-1. These beta-substituted ethanols may conveniently be represented by the general formula

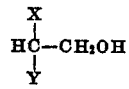

wherein X is H or OH and Y is an OH, lower alkoxy, lower hydroxy alkyl or lower hydroxy alkyl ether radical when X is H or OH and Y is an OH, lower hydroxy alkyl or lower hydroxy alkyl ether radical when X is H.

The proportions of the components can be varied in wide limits. The acid, urea and formaldehyde components can be varied within a fairly wide range. The preferred range is:

| | Parts by weight |
|---|---|
| Acid component | 4 to 40 |
| Aldehyde component | 35 to 80 |
| Urea component | 10 to 30 |
| Ethanol component | 0.3 to 25 |

The aqueous solutions of the resins used in treating textiles will vary in concentrations depending upon the textile to be treated, the time of contact, etc. Generally, a concentration in the range of from about 1 to about 15 weight per cent is preferred. The curing can be at about 100° C. to 115° C. without the need of any additional material.

In order to illustrate the treatment of textiles in accordance with the invention, but not as a limitation of the latter as otherwise disclosed herein, the following examples are included:

*Example 3*

A piece of 80 x 80 percale cloth, 4 yards per pound, 39 inches grey width was dipped and thoroughly impregnated with 10 weight per cent aqueous solution of the product of Example 1. The excess liquid was removed by squeezing, and the cloth was dried at room temperature. It was then heated at 110° C. for one minute. The resulting cloth had a characteristic resilient hand or feel. Upon laundering in an aqueous solution of 0.2 weight per cent soap at a temperature of 100° C. for 30 minutes and rinsing, followed by drying, the characteristic hand was retained. This test was repeated with the product of Example 2, and similar results were obtained.

*Example 4*

2%, based on the weight of the fiber, of the resin of Example 1 was added to the beater containing pulp which was not rosin sized. The pulp was beaten and then made into a sheet of paper using an elevated temperature in the conventional manner. After conditioning the sheet for six days, the wet Mullen test was 25. The dry strength also was improved.

Paper from similar pulp without added resin showed a wet Mullen test of 11.

*Example 5*

2%, based on the weight of the fiber, of the resin of Example 1 was added to the beater containing pulp which was rosin sized in the usual manner. The pulp was beaten and then made into a sheet of paper using an elevated temperature in the conventional manner. After conditioning the sheet for six days, the wet Mullen test was 45. The dry strength also was improved.

Paper from similar pulp without added resin showed a wet Mullen test of 24.

Paper, sized or unsized, may be treated with the resins of the invention and then dried at the elevated temperature so as to improve the wet strength, dry strength, and other properties thereof.

*Example 6*

1.5 lbs. of carbon black, 0.5 lb. of phthallocyanine blue pigment (B-71) and 0.25 lb. of phthallocyanine green pigment (G-47) were dispersed in 2 gallons of water and the mixture was heated with live steam. It was added to 40 gallons of cold water, and then 50 lbs. of the resin of Example 1 was added thereto. The mix was heated to 170° F. with live steam and then made up to 50 gallons by adding water. The mixture was applied to heavy poplin cloth on a 3 roll pad; then the cloth was skyed for 30 seconds by running through a pre-drier (with heat shut off), dried on a can drier and cured at 340° F. for somewhat less than 2 minutes. The resin binds the color to the textile fabric. The color of the resulting pigment dyed cloth resists laundering.

The resinous compositions of the invention may be blended with starch, polyvinyl alcohol and the like to give a textile stiffening agent which can be insolubilized on the textile. Dispersions or emulsions containing the new resins in the aqueous phase may be applied to and insolubilized on textiles and the like materials. For example, the aqueous dispersion of the resin may be emulsified with an evaporative organic solvent, such as a hydrocarbon, and suitable emulsifying agents may be included. Preferably the aqueous phase is the outer phase but under some circumstances the phase relationship may be reversed. The non-aqueous phase may also include a flexible material such as rubber, or a vulcanized oil. Such emulsions break upon application and drying, leaving the resin distributed in a form depending on the emulsion and its components.

The resin can be used along with plasticizers, extenders or modifying agents, including those of a resinous nature, without departing from the invention.

The new resinous compositions make possible the curing of the treated fibrous material at lower curing temperatures without increasing the usual curing time, or at shorter curing times at the usual higher curing temperatures. This results in improved strength of finished products, as compared to known treating materials.

In view of the foregoing disclosure, variations and modifications thereof will be apparent to one skilled in the art. The invention includes all such variations and modifications as come within the scope of the appended claims.

We claim:

1. An aqueous solution of a resinous composition comprising a reaction product prepared by reacting, as the sole reactants, (1) from 4 to 40 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 10 to 30 parts by weight of a component selected from the group consisting of urea, thiourea, guanidine, carbamyl urea and biuret, (3) from 35 to 80 parts by weight of an aldehyde component, and (4) from 0.3 to 25 parts by weight of an ethanol having the general formula

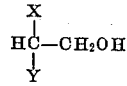

wherein X is a member of the group consisting of H and OH and Y is a member of the group consisting of OH, lower alkoxy, lower hydroxy alkyl and lower hydroxy alkyl ether radicals, Y being a member of the group consisting of OH and lower hydroxy alkyl ether radicals when X is H, and being a member of the group consisting of lower alkoxy and lower hydroxy alkyl radicals when X is OH.

2. An aqueous solution of a resinous composition comprising a reaction product prepared by reacting, as the sole reactants, (1) from 4 to 40 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 10 to 30 parts by weight of a component selected from the group consisting of urea, thiourea, guanidine, carbamyl urea and biuret, (3) from 35 to 80 parts by weight of an aldehyde component, and (4) from 0.3 to 25 parts by weight of a glycol.

3. An aqueous solution of a resinous composition comprising a reaction product prepared by reacting, as the sole reactants, from 4 to 40 parts by weight of lactic acid, from 10 to 30 parts by weight of urea, from 35 to 80 parts by weight of formaldehyde, and from 0.3 to 25 parts by weight of a glycol.

4. A method of making a resinous composition which comprises mixing, as the sole reactants in the presence of water, (1) from 4 to 40 parts by weight of an alpha-hydroxy-monocarboxylic acid having the general formula RCOOH, wherein R is a member of the group consisting of lower alkyl and phenyl radicals substituted in the alpha-position by a hydroxy group, (2) from 10 to 30 parts by weight of a component selected from the group consisting of urea, thiourea, guanidine, carbamyl urea and biuret, (3) from 35 to 80 parts by weight of an aldehyde component, and (4) from 0.3 to 25 parts by weight of an ethanol having the general formula

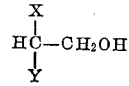

wherein X is a member of the group consisting of H and OH and Y is a member of the group consisting of OH, lower alkoxy, lower hydroxy alkyl and lower hydroxy alkyl ether radicals Y being a member of the group consisting of OH and lower hydroxy alkyl ether radicals when X is H, and being a member of the group consisting of lower alkoxy and lower hydroxy alkyl radicals when X is OH, and heating until the solution becomes viscous.

5. Method of making a resinous composition which comprises mixing, in the presence of water, from 4 to 40 parts by weight of lactic acid and from 35 to 80 parts by weight of formaldehyde, heating with agitation, cooling and adding from 10 to 30 parts by weight of urea, heating with agitation, cooling and adding from 0.3 to 25 parts by weight of ethylene glycol.

6. Method of making a resinous composition which comprises heating, in the presence of water, a mixture of from 4 to 40 parts by weight of lactic acid and from 0.3 to 25 parts by weight of ethylene glycol, adding from 10 to 30 parts by weight of urea and from 35 to 80 parts by weight of formaldehyde, and heating.

FRED G. LA PIANA.
GEORGE N. HOUTH.
RAYMOND W. FARRELL.

REFERENCES CITED

The following references are of record in the file of this patent:

UNITED STATES PATENTS

| Number | Name | Date |
|---|---|---|
| 1,898,709 | Belfit | Feb. 21, 1933 |
| 2,136,110 | Lane | Nov. 8, 1938 |
| 2,197,357 | Widmer | Apr. 16, 1940 |
| 2,248,696 | Cassel | July 8, 1941 |
| 2,317,181 | D'Alelio | Apr. 20, 1943 |
| 2,322,887 | Schwartz | June 29, 1943 |
| 2,326,265 | Tawney | Aug. 10, 1943 |
| 2,338,602 | Schur | Jan. 4, 1944 |
| 2,341,266 | D'Alelio | Feb. 8, 1944 |
| 2,342,641 | Cassel | Feb. 29, 1944 |
| 2,365,813 | Gluesenkamp | Dec. 26, 1944 |
| 2,374,812 | Gutkin | May 1, 1945 |
| 2,394,289 | Boughton | Feb. 5, 1946 |

FOREIGN PATENTS

| Number | Country | Date |
|---|---|---|
| 320,915 | Great Britain | Oct. 28, 1929 |
| 535,745 | Germany | Oct. 19, 1931 |